US010203731B1

United States Patent
Brocklesby

(10) Patent No.: US 10,203,731 B1
(45) Date of Patent: Feb. 12, 2019

(54) SEMI-SOLID HINGE COVER

(71) Applicant: Dell Products L.P., Round Rock, TX (US)

(72) Inventor: Brandon Joel Brocklesby, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/009,248

(22) Filed: Jun. 15, 2018

(51) Int. Cl.
*G06F 1/16* (2006.01)
(52) U.S. Cl.
CPC .......... *G06F 1/1681* (2013.01); *G06F 1/1618* (2013.01); *G06F 1/1683* (2013.01)
(58) Field of Classification Search
CPC ............................ G06F 1/1618; G06F 1/1681
See application file for complete search history.

(56) References Cited

U.S. PATENT DOCUMENTS

| 6,104,605 A * | 8/2000 | Lee ........................ G06F 1/1616 248/917 |
| 9,348,450 B1 * | 5/2016 | Kim ....................... G06F 1/1681 |
| 2015/0241925 A1 * | 8/2015 | Seo ........................ G06F 1/1652 361/679.27 |
| 2017/0023985 A1 * | 1/2017 | Xin ........................ G06F 1/1681 |
| 2018/0049329 A1 * | 2/2018 | Seo ........................... E05D 3/06 |
| 2018/0059718 A1 * | 3/2018 | Ramaswamy ......... G06F 1/1616 |
| 2018/0196468 A1 * | 7/2018 | Watamura ............. G06F 1/1616 |

* cited by examiner

*Primary Examiner* — Anthony Q Edwards
(74) *Attorney, Agent, or Firm* — Jackson Walker L.L.P.

(57) ABSTRACT

In accordance with embodiments of the present disclosure, a system may include a first member, a second member hingedly coupled to the first member via one or more hinges, and a hinge cover coupled between the first member and the second member for enclosing the one or more hinges, the hinge cover comprising an outer cover member and an inner cover member generally internal to the outer cover member and comprising a flexible, elastic material configured to elongate and compress to overcome hinge interference of the one or more hinges during rotation of the first member relative to the second member in order to minimize a physical size of the hinge cover.

20 Claims, 7 Drawing Sheets

SEMI-SOLID HINGE COVER

TECHNICAL FIELD

The present disclosure relates in general to information handling systems, and more particularly to a semi-solid hinge cover that enables an information handling system with a thin profile.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Because of their mobility, consumers of information handling systems increasingly use laptops. A laptop, often referred to as a "notebook", may be a small, portable information handling system with a "clamshell" form factor including a keyboard assembly on a lower portion of the clamshell and a display assembly comprising a thin liquid crystal display screen or light-emitting diode display screen on an upper portion of the clamshell, with the keyboard assembly mechanically coupled to the display assembly via a mechanical hinge. Accordingly, the keyboard assembly and the display assembly may be rotated to an open position in order for a user to use the laptop. Conversely, a user may fold a laptop into its closed position for transportation, and thus may be suitable for mobile use.

Customers of notebook information handling systems often desire thin and sleek form factors. The drive to create thin notebooks requires new and unique hinge solutions. These low-profile solutions often have difficult product-based requirements for the hinge and related cabling solutions between the keyboard assembly and display assembly. Such requirements may become more difficult in supporting "2-in-1 products" that allow 360-degree rotation of the keyboard assembly relative to the display assembly. However, the hinge of a notebook may play an important aspect of an overall cosmetic look of a notebook. Accordingly, systems and methods are desired to enable a hinge cover solution enabling the use of multi-axis hinges or small dual-axis hinges and cable routing the enabled 360-degree rotations while providing a pleasing cosmetic appearance.

SUMMARY

In accordance with the teachings of the present disclosure, the disadvantages and problems associated existing approaches to providing hinges and hinge covers in an information handling system may be reduced or eliminated.

In accordance with embodiments of the present disclosure, a system may include a first member, a second member hingedly coupled to the first member via one or more hinges, and a hinge cover coupled between the first member and the second member for enclosing the one or more hinges, the hinge cover comprising an outer cover member and an inner cover member generally internal to the outer cover member and comprising a flexible, elastic material configured to elongate and compress to overcome hinge interference of the one or more hinges during rotation of the first member relative to the second member in order to minimize a physical size of the hinge cover.

In accordance with these and other embodiments of the present disclosure, a hinge cover for enclosing one or more hinges for hingedly coupling a first member to a second member may be provided, the hinge cover comprising an outer cover member and an inner cover member generally internal to the outer cover member and comprising a flexible, elastic material configured to elongate and compress to overcome hinge interference of the one or more hinges during rotation of the first member relative to the second member in order to minimize a physical size of the hinge cover.

In accordance with these and other embodiments of the present disclosure, a method comprising may include providing an outer cover member and providing an inner cover member generally internal to the outer cover member and comprising a flexible, elastic material configured to elongate and compress to overcome hinge interference of one or more hinges covered by a hinge cover comprising the outer cover member and the inner cover member during rotation of a first member relative to a second member hingedly coupled to the first member via the one or more hinges in order to minimize a physical size of the hinge cover.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 5, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

Figure 1:
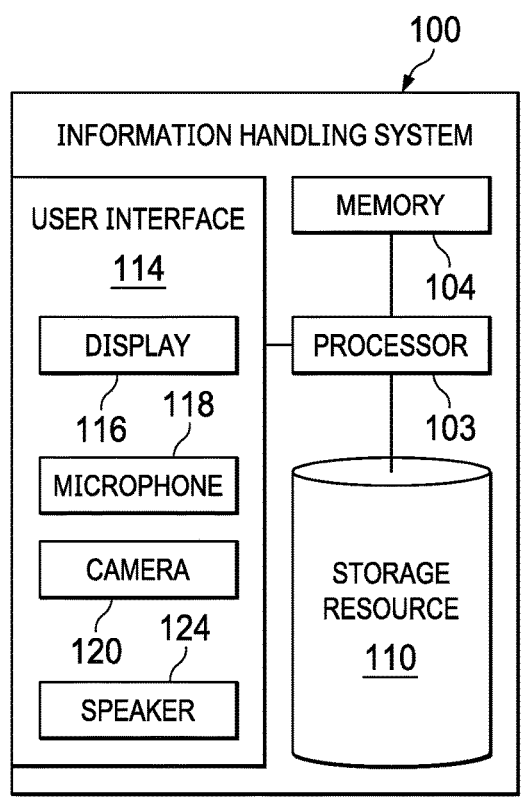
FIG. 1 illustrates a functional block diagram of selected components of an example information handling system, in accordance with embodiments of the present disclosure.

FIG. 1 illustrates a functional block diagram of selected components of an example information handling system 100, in accordance with embodiments of the present disclosure. In some embodiments, information handling system 100 may be a personal computer (e.g., a desktop computer or a portable computer). In other embodiments, information handling system 100 may comprise a mobile device (e.g., smart phone, a tablet computing device, a handheld computing device, a personal digital assistant, or any other device that may be readily transported on a person of a user of such mobile device).

As depicted in FIG. 1, information handling system 100 may include a processor 103, a memory 104 communicatively coupled to processor 103, a storage resource 110 communicatively coupled to processor 103, and a user interface 114 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 110, and/or another component of information handling system 100.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its associated information handling system 100 is turned off.

Storage resource 110 may include a system, device, or apparatus configured to store data. Storage resource 110 may include one or more hard disk drives, magnetic tape libraries, optical disk drives, magneto-optical disk drives, solid state storage drives, compact disk drives, compact disk arrays, disk array controllers, and/or any other systems, apparatuses or devices configured to store data. In certain embodiments, storage resource 110 may include one or more storage enclosures configured to hold and/or power one or more of such devices. In the embodiments represented by FIG. 1, storage resource 110 may reside within information handling system 100. However, in other embodiments, storage resource 110 may reside external to information handling system 100 (e.g., may be coupled to information handling system 100 via a network).

User interface 114 may comprise any instrumentality or aggregation of instrumentalities by which a user may interact with information handling system 100. For example, user interface 114 may permit a user to input data and/or instructions into information handling system 100 (e.g., via a keypad, keyboard, touch screen, microphone, camera, and/or other data input device), and/or otherwise manipulate information handling system 100 and its associated components. User interface 114 may also permit information handling system 100 to communicate data to a user (e.g., via a display device, speaker, and/or other data output device).

As shown in FIG. 1, user interface 114 may include one or more of a display 116, microphone 118, camera 120, and speaker 124.

Display 116 may comprise any suitable system, device, or apparatus configured to display human-perceptible graphical data and/or alphanumeric data to a user. For example, in some embodiments, display 116 may comprise a liquid crystal display.

Microphone 118 may comprise any system, device, or apparatus configured to convert sound incident at microphone 118 to an electrical signal that may be processed by processor 103. In some embodiments, microphone 118 may include a capacitive microphone (e.g., an electrostatic microphone, a condenser microphone, an electret microphone, a microelectromechanical systems (MEMs) microphone, etc.) wherein such sound is converted to an electrical signal using a diaphragm or membrane having an electrical capacitance that varies as based on sonic vibrations received at the diaphragm or membrane.

Camera 120 may comprise any system, device, or apparatus configured to record images (moving or still) into one or more electrical signals that may be processed by processor 103.

Speaker 124 may comprise any system, device, or apparatus configured to produce sound in response to electrical audio signal input.

In addition to processor 103, memory 104, storage resource 110, and user interface 114, information handling system 100 may include one or more other information handling resources. Such an information handling resource may include any component system, device or apparatus of an information handling system, including without limitation, a processor, bus, memory, I/O device and/or interface, storage resource (e.g., hard disk drives), network interface, electro-mechanical device (e.g., fan), display, power supply, and/or any portion thereof. An information handling resource may comprise any suitable package or form factor, including without limitation an integrated circuit package or a printed circuit board having mounted thereon one or more integrated circuits.

Figure 2A:
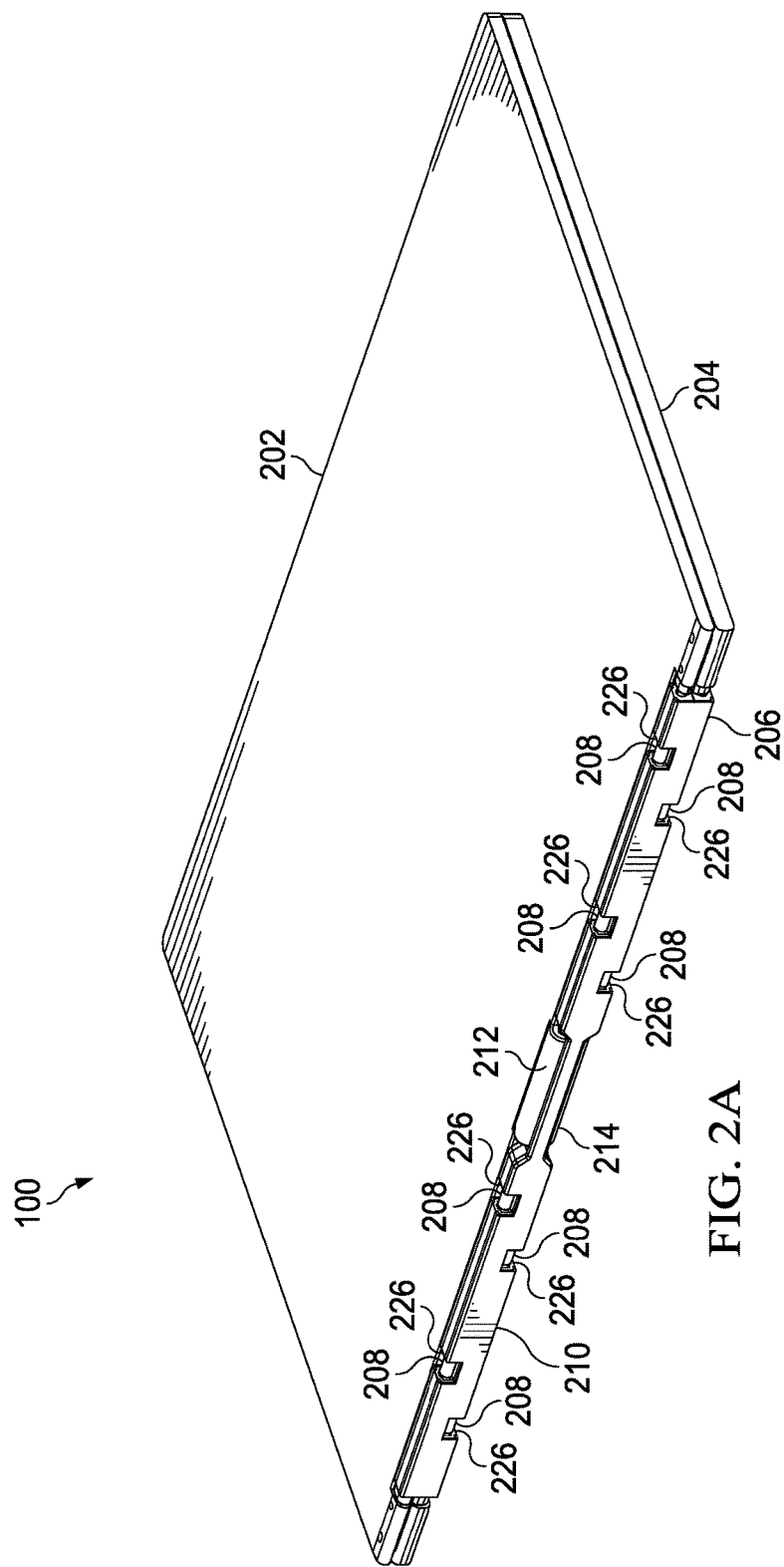
FIG. 2A illustrates an exterior perspective view of an example information handling system, in accordance with embodiments of the present disclosure.
Figure 2B:
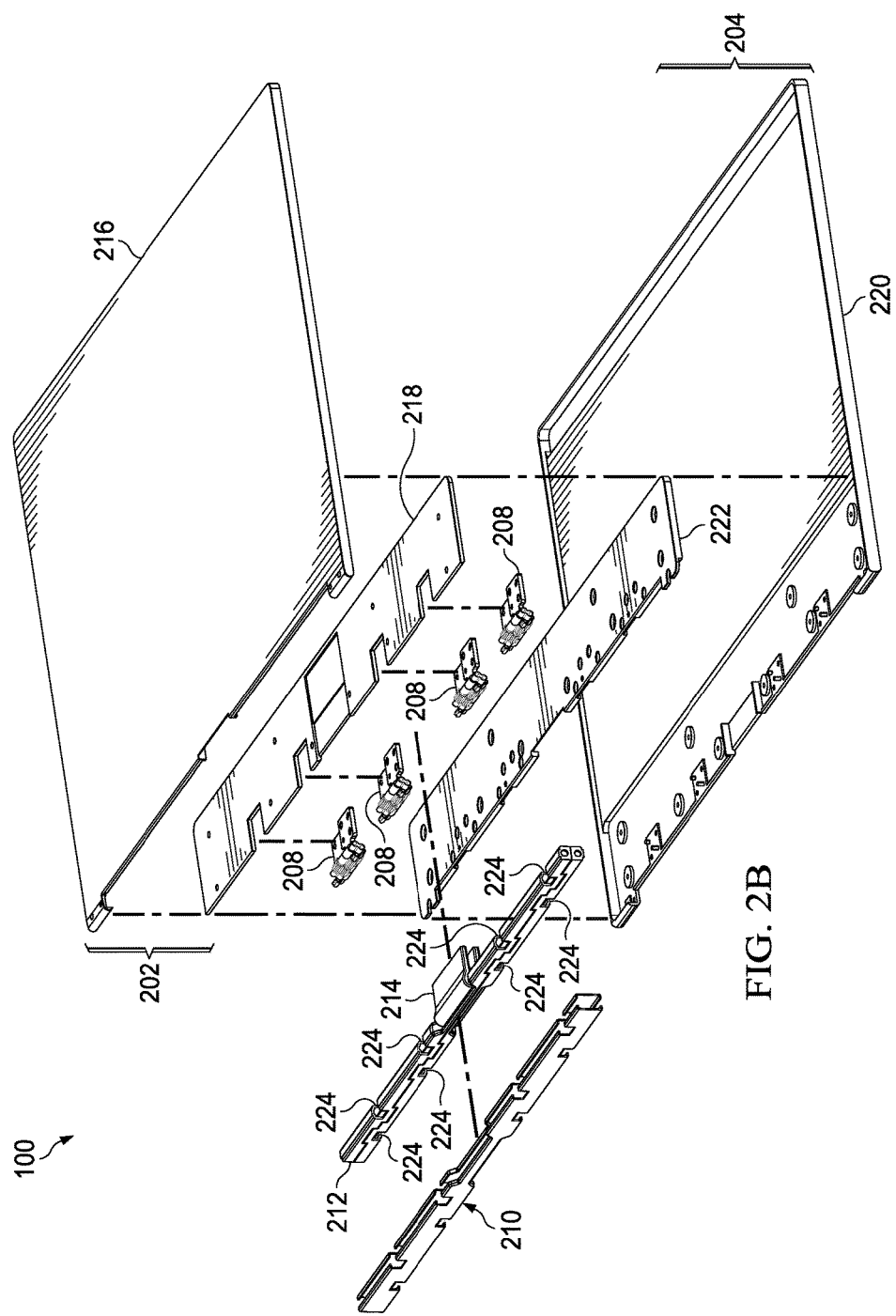
FIG. 2B illustrates an exploded perspective view of various components of a chassis of the example information handling system of FIG. 2A, in accordance with embodiments of the present disclosure.
Figure 2C:
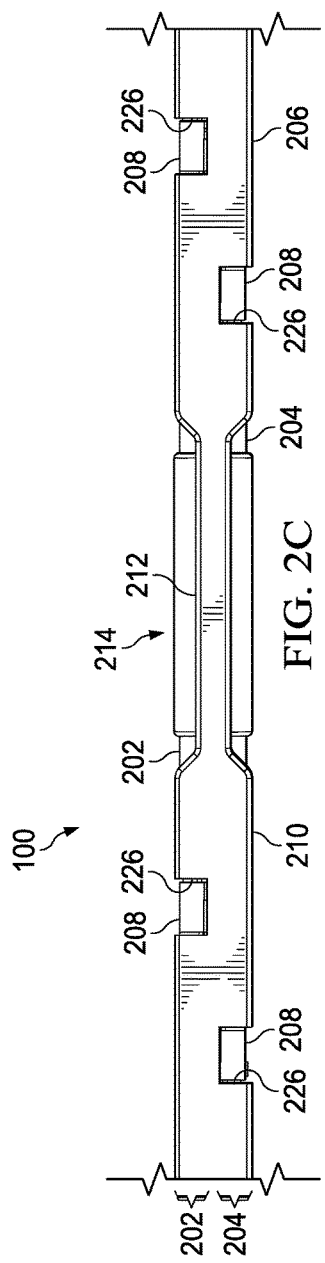
FIG. 2C illustrates an exterior rear view of a portion of the example information handling system of FIG. 2A, in accordance with embodiments of the present disclosure.

FIGS. 2A-2C depict various views of various components of example information handling system 100. FIG. 2A illustrates an exterior perspective view of example information handling system 100, in accordance with embodiments of the present disclosure. FIG. 2B illustrates an exploded perspective view of various components of a chassis of example information handling system 100, in accordance with embodiments of the present disclosure. FIG. 2C illustrates an exterior rear view of a portion of information handling system 100 in accordance with embodiments of the present disclosure.

As depicted in FIGS. 2A-2C, information handling system 100 may include a display assembly 202 and a keyboard assembly 204 hingedly coupled to display assembly 202 via a hinge assembly 206. Each of display assembly 202 and keyboard assembly 204 may be integral parts of a chassis, case, or housing, for information handling system 100. Each of display assembly 202 and keyboard assembly 204 may have an enclosure made from one or more suitable materials, including without limitation plastic, steel, and/or aluminum.

In operation, information handling system 100 may be translated about hinges (e.g., multi-axis hinges 208 shown on FIGS. 2A-2C) between a closed position (e.g., a position of display assembly 202 relative to keyboard assembly 204 such that display assembly 202 substantially overlays keyboard assembly 204, or vice versa) and an open position (e.g., a position of display assembly 202 relative to keyboard assembly 204 such that display assembly 202 does not substantially overlay keyboard assembly 204, or vice versa, such as when the angle formed by display assembly 202 and keyboard assembly 204 at hinge assembly 206 is substantially non-zero). In some embodiments, information handling system 100 may be configured to allow for 360 degrees of rotation of display assembly 202 relative to keyboard assembly 204 (e.g., zero degrees in the closed position and 360 degrees in a "tablet" configuration).

As used herein, the "open" state may refer generally to any state other than the "closed" or "tablet" state. In some instances, the "open" state may also be referred to as a "flat" or "maximum extension" state. Accordingly, information handling system 100 may have multiple positions in the "open" state.

As shown in FIGS. 2A-2C, hinge assembly 206 may comprise a plurality of multi-axis hinges 208 and a hinge cover including an outer cover member 210 and an inner cover member 212. Each multi-axis hinge 208 may comprise a mechanical hinge with a plurality of axes of rotation such that, taken together, multi-axis hinges 208 enable translation of information handling system 100 from a closed or tablet position to an open position, and vice versa.

At least a portion of each multi-axis hinge 208 may be disposed within a corresponding cavity or cavities of the hinge cover, such as cavities 224 of inner cover member 212 shown in FIG. 2B, for example. Accordingly, the hinge cover may cover portions of multi-axis hinges 208 in a cosmetic or aesthetically-pleasing manner.

Outer cover member 210 may comprise aluminum, other metal material, plastic, or other suitable material. In some embodiments, outer cover member 210 may be made of hard, inflexible material. In these and other embodiments, outer cover member 210 may have slots 226 formed therein to permit flanges of multi-axis hinges 208 to pass through the hinge cover so that multi-axis hinges may be mechanically covered to display assembly 202 and keyboard assembly 204.

Inner cover member 212 may comprise an elastomer or other suitable flexible material capable of stretching or compression as information handling system 100 is translated from a closed or tablet position to an open position, and vice versa, as shown and described in greater detail below. As depicted in FIGS. 2A-2C, inner cover member 212 may have a flexible, pliable cable routing passage 214 through which cables or other items may be routed between display assembly 202 and keyboard assembly 204, shown and described in greater detail below.

Also as shown in FIG. 2B, display assembly 202 may include a base member 216 and a cable plate 218 mechanically coupled to base member 216, which may capture cable routed through cable routing passage 214 of inner cover member 212. Similarly, keyboard assembly 204 may include a base member 220 and a cable plate 222 mechanically coupled to base member 216, which may capture cable routed through cable routing passage 214 of inner cover member 212.

Although information handling system 100 is shown in FIGS. 2A-2C as having certain components (e.g., display assembly 202, keyboard assembly 204, and hinge assembly 206), information handling system 100 may include any other suitable components which may not have been depicted in FIGS. 2A-2C for the purposes of clarity and exposition.

Figure 3A:
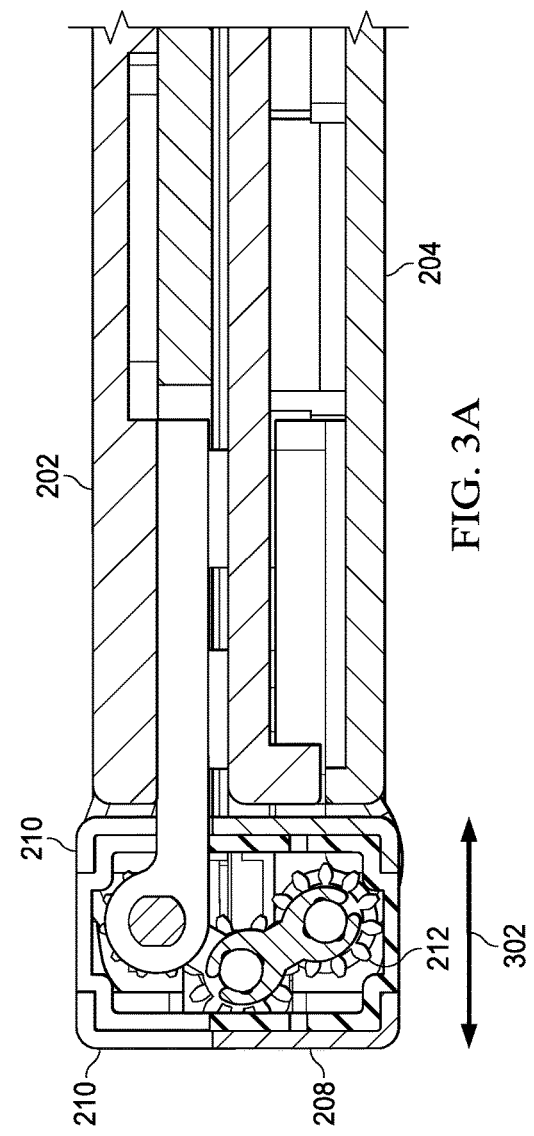
FIG. 3A illustrates a cross-sectional side view of the chassis of the example information handling system of FIG. 2A in a closed or tablet position, in accordance with embodiments of the present disclosure.
Figure 3B:
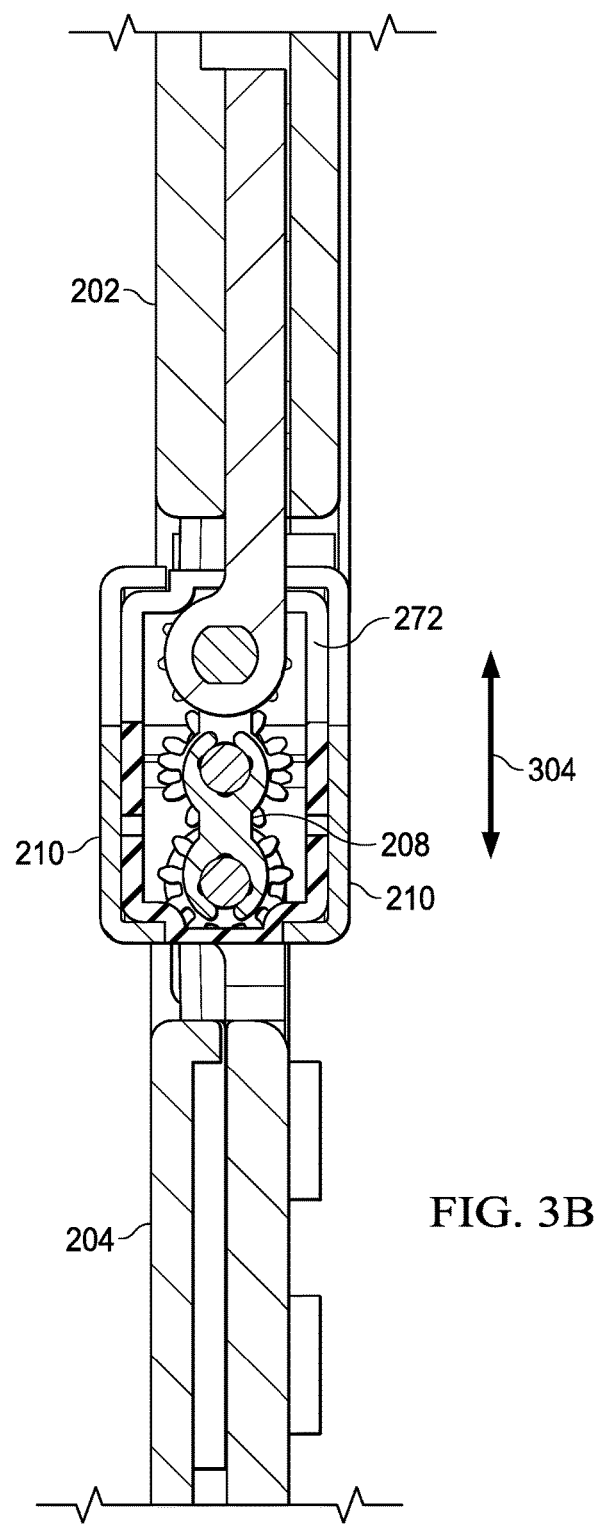
FIG. 3B illustrates a cross-sectional side view of the chassis of the example information handling system of FIG. 2A in an open position, in accordance with embodiments of the present disclosure.

FIGS. 3A and 3B depict cross-section side views of hinge assembly 206 and portions of display assembly 202 and keyboard assembly 204 proximate to hinge assembly 206.

FIG. 3A illustrates a cross-sectional side view of hinge assembly 206 with information handling system 100 in a closed or tablet position, in accordance with embodiments of the present disclosure. FIG. 3B illustrates a cross-sectional side view of hinge assembly 206 with information handling system 100 in an open position, in accordance with embodiments of the present disclosure. In FIGS. 3A and 3B, a multi-axis hinge 208 is shown as a three-axis hinge. However, each multi-axis hinge 208 of information handling system 100 may include any suitable number of axes.

As shown in FIG. 3A, as information handling system 100 is translated from an open position to a closed or tablet position, inner cover member 212 may elongate in a direction 302 and compress in a direction perpendicular to direction 302. Similarly as shown in FIG. 3B as information handling system 100 is translated from a closed or tablet position to an open position, inner cover member 212 may elongate in a direction 304 and compress in a direction perpendicular to direction 304. Thus, the flexible elastomer material of inner cover member 212 may elongate and compress to overcome mechanical interference of multi-axis hinges 208 during the translation of display assembly 202 relative to keyboard assembly 204, in order to minimize the size of the hinge cover.

Figure 4:
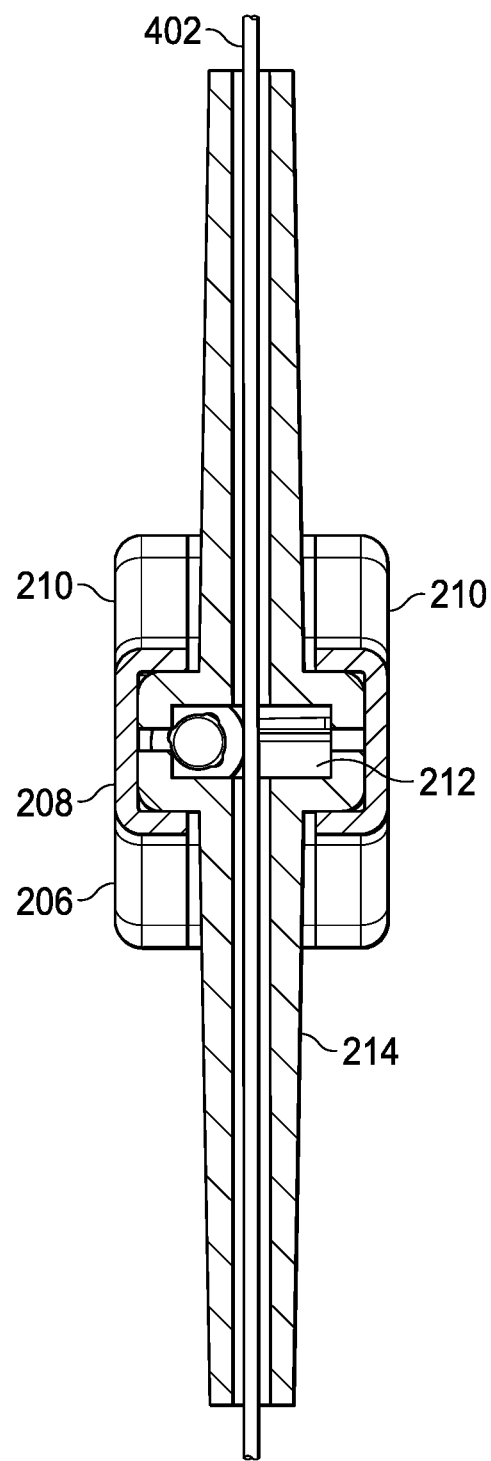
FIG. 4 illustrates a cross-sectional side view of the hinge cover of the example information handling system of FIG. 2A, in accordance with embodiments of the present disclosure.
Figure 5:
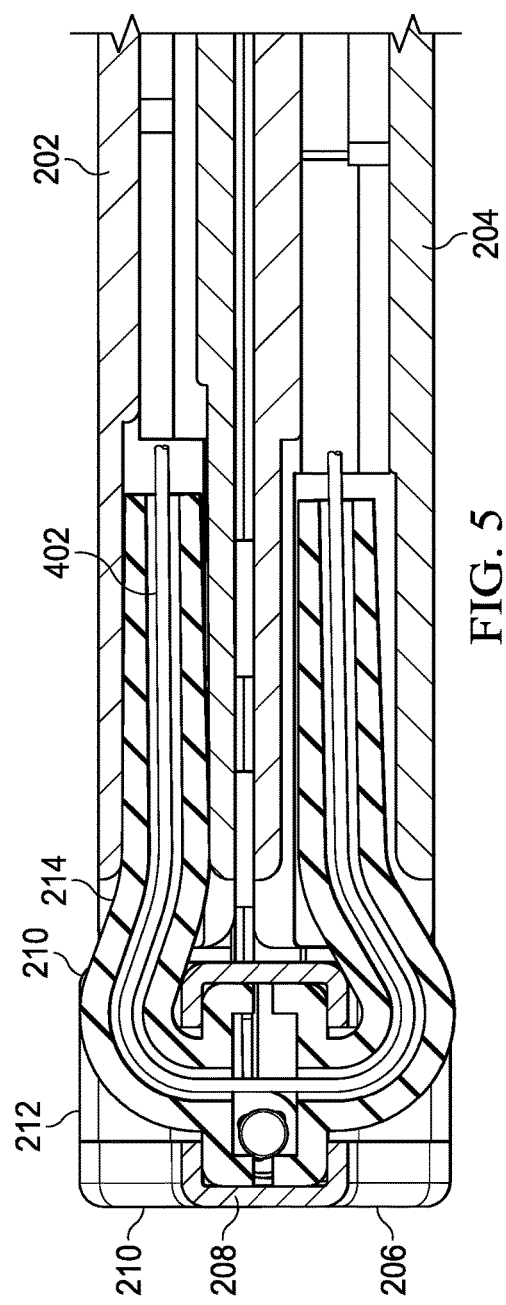
FIG. 5 illustrates another cross-sectional side view of the chassis of the example information handling system of FIG. 2A in a closed or tablet position with detail of a cable routing portion of the hinge cover of the example information handling system of FIG. 2A, in accordance with embodiments of the present disclosure.

FIG. 4 illustrates a cross-sectional side view of the hinge cover of example information handling system 100, in accordance with embodiments of the present disclosure. As shown in FIG. 4, inner cover member 212 may be formed within a cable routing passage 214 to allow routing of one or more cables 402 or other items between display assembly 202 and keyboard assembly 204 via hinge assembly 206. When constructed (e.g., via molding), cable routing passage 214 may be substantially straight and one or more cables 402 or other items may be passed through cable routing passage 214 prior to assembly of information handling system 100. After assembly, cable routing passage 214 may change shape as display assembly 202 is rotated relative to keyboard assembly 204, and maintain a conduit for routing cables 402 between display assembly 202 and keyboard assembly 204, as shown in FIG. 5. FIG. 5 illustrates a cross-sectional side view of a portion of the chassis of information handling system 100 in a closed or tablet position with detail of cable routing passage 214 of the hinge cover of information handling system 100, in accordance with embodiments of the present disclosure.

The methods and systems herein provide a semi-solid hinge cover with an elastomer inner cover member and an outer cover member which may provide a cosmetic or aesthetically-pleasing appearance, while maintaining a thin profile for an information handling system as a result of the deformation (e.g., elongation and compression) of the inner cover member of the hinge cover when a display assembly of the information handling system is rotated relative to a keyboard assembly of the information handling system about one or more multi-axis hinges. The outer cover member may also provide a hard protective surface for components of the information handling system, and an overall fixed shape for the information handling system.

The hinge cover may be undersized relative to the information handling system such that, during 360 rotation of the multi-axis hinges, the hinge cover expands or elongates in the depth and height of the information handling system, enabling a minimum-sized hinge cover.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A system comprising:
   a first member;
   a second member hingedly coupled to the first member via one or more hinges; and
   a hinge cover coupled between the first member and the second member for enclosing the one or more hinges, the hinge cover comprising:
      an outer cover member; and
      an inner cover member generally internal to the outer cover member and comprising a flexible, elastic material configured to elongate and compress to overcome hinge interference of the one or more hinges during rotation of the first member relative to the second member in order to minimize a physical size of the hinge cover.

2. The system of claim 1, wherein the first member comprises a keyboard assembly.

3. The system of claim 1, wherein the second member comprises a display assembly.

4. The system of claim 1, wherein the one or more hinges comprises at least one multi-axis hinge.

5. The system of claim 1, wherein the flexible, elastic material comprises an elastomer.

6. The system of claim 1, wherein the outer cover member comprises a metal.

7. The system of claim 1, wherein the inner cover member has formed therein a flexible, pliable cable routing passage for enclosing and routing one or more items between the first member and the second member.

8. A hinge cover for enclosing one or more hinges for hingedly coupling a first member to a second member, the hinge cover comprising:
   an outer cover member; and
   an inner cover member generally internal to the outer cover member and comprising a flexible, elastic material configured to elongate and compress to overcome hinge interference of the one or more hinges during rotation of the first member relative to the second member in order to minimize a physical size of the hinge cover.

9. The hinge cover of claim 8, wherein the first member comprises a keyboard assembly.

10. The hinge cover of claim 8, wherein the second member comprises a display assembly.

11. The hinge cover of claim 8, wherein the one or more hinges comprises at least one multi-axis hinge.

12. The hinge cover of claim 8, wherein the flexible, elastic material comprises an elastomer.

13. The hinge cover of claim 8, wherein the outer cover member comprises a metal.

14. The hinge cover of claim 8, wherein the inner cover member has formed therein a flexible, pliable cable routing passage for enclosing and routing one or more items between the first member and the second member.

15. A method comprising:
providing an outer cover member; and
providing an inner cover member generally internal to the outer cover member and comprising a flexible, elastic material configured to elongate and compress to overcome hinge interference of one or more hinges covered by a hinge cover comprising the outer cover member and the inner cover member during rotation of a first member relative to a second member hingedly coupled to the first member via the one or more hinges in order to minimize a physical size of the hinge cover.

16. The method of claim 15, wherein:
the first member comprises a keyboard assembly; and
the second member comprises a display assembly.

17. The method of claim 15, wherein the one or more hinges comprises at least one multi-axis hinge.

18. The method of claim 15, wherein the flexible, elastic material comprises an elastomer.

19. The method of claim 15, wherein the outer cover member comprises a metal.

20. The method of claim 15, further comprising forming within the inner cover member a flexible, pliable cable routing passage for enclosing and routing one or more items between the first member and the second member.

* * * * *